United States Patent
Arlauskas et al.

[15] 3,692,328
[45] Sept. 19, 1972

[54] CONTROL MEANS FOR OCCUPANT RESTRAINT BELT RETRACTOR

[72] Inventors: Alfonsas Arlauskas, Troy; Lloyd W. Rogers, Jr., East Detroit, both of Mich.

[73] Assignee: General Motors Corporation, Detroit, Mich.

[22] Filed: May 21, 1971

[21] Appl. No.: 145,797

[52] U.S. Cl. ............................. 280/150 SB, 297/389
[51] Int. Cl. .............................................. B60r 21/02
[58] Field of Search .......... 280/150 SB, 150 B, 150 R

[56] References Cited

UNITED STATES PATENTS

| | | | |
|---|---|---|---|
| 2,852,270 | 9/1958 | Hunt | 280/150 SB |
| 2,858,144 | 10/1958 | Oppenheim | 280/150 SB |
| 2,411,602 | 11/1968 | Royce | 280/150 SB X |
| 3,506,083 | 4/1970 | Botnick | 280/150 SB X |
| 3,583,726 | 6/1971 | Lindblad | 280/150 SB |

*Primary Examiner*—Leo Friaglia
*Attorney*—W. E. Finken and Herbert Furman

[57] ABSTRACT

A vehicle body includes a door movable between open and closed positions and mounting a door lock engageable with a striker on the body for holding the door in closed position. The lock is of the uncoupling type and includes inside and outside release handles connected to an operating lever which is selectively coupled to and uncoupled from the detent for the lock bolt. A restraint belt includes lap and shoulder belts which are moved between restrained and unrestrained positions with respect to an occupant seating position upon extension and retraction of an outbaord belt relative to a belt retractor mounted on the door. The retractor includes a belt anchoring reel having ratchet end plates and a pawl which is normally spring biased into engagement with the end plates to block movement of the reel in a belt extending direction. A first release lever is mounted on the retractor and resiliently biased into engagement with a fixed stop to locate the lever in unactuated position. When the first lever is moved to actuated position, it engages a pawl extension to move the pawl into released position. A manually operable handle on the retractor is movable independently of the first release lever into engagement with the pawl extension to also move the pawl to released position. A blocking lever is mounted on the lock and is resiliently biased to blocking position. The blocking lever is moved to unblocking position by engagement with the striker when the bolt moves to latched position in engagement therewith. A second release lever is mounted on the lock for movement transversely of the path of movement of the blocking lever. A rod connects the first and second levers for simultaneous movement to thereby normally locate the second lever in unactuated position wherein it is engageable by the lock operating lever. When either release handle is operated and the lock operating lever is uncoupled from the detent, the lock operating lever moves the second release lever to actuated position transverse of the path of the blocking lever and likewise moves the first lever to actuated position to release the pawl. When the release handle is released, the first and second levers return to unactuated position. When the lock operating lever is coupled to the detent, movement thereof by a release lever releases the pawl and also releases the lock bolt from the striker. The initial opening movement of the door permits the blocking lever to move to blocking position in the path of the second release lever and block return movement thereof and of the first lever to unactuated position when the release handle is released. The pawl thus remains released while the door is open.

4 Claims, 4 Drawing Figures

PATENTED SEP 19 1972

INVENTORS
Alfonsas Arlauskas &
BY Lloyd W. Rogers, Jr.

Herbert Furman
ATTORNEY

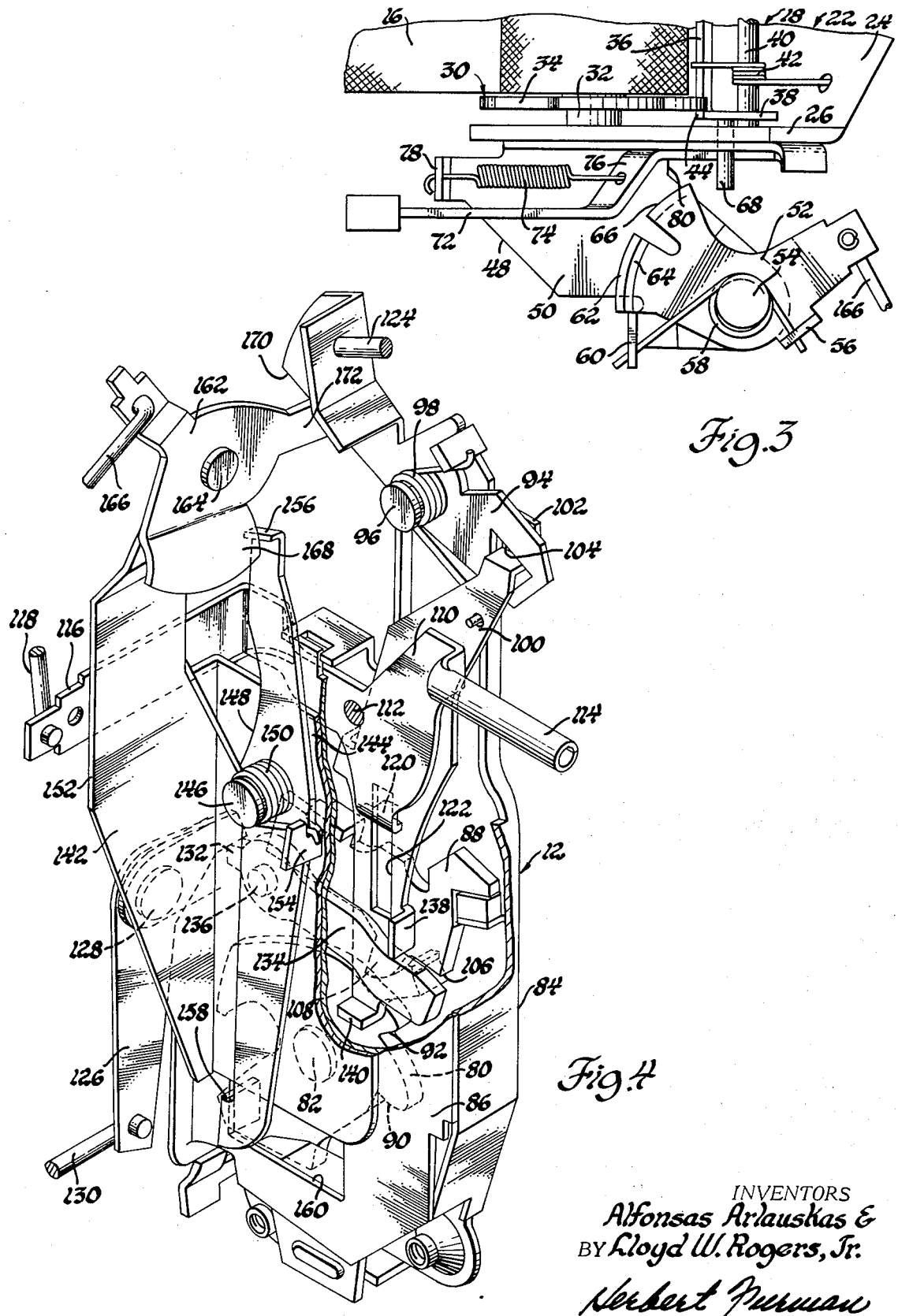

CONTROL MEANS FOR OCCUPANT RESTRAINT BELT RETRACTOR

This invention relates generally to a control means for releasing a normally locked occupant restraint belt retractor to permit movement of a passive type restraint belt from restrained to unrestrained positions, and more particularly to such a control means controlling release of the retractor in accordance with the operating condition of a vehicle body door lock.

The control means of this invention is of the type disclosed in application Ser. No. 144,470 Augunas et al., filed May 18, 1971, and assigned to the assignee of this invention. Both control means permit a seated occupant to obtain release of the retractor while the door remains closed and locked so that he may move within the vehicle by manually moving the restraint belt to an unrestrained position. They also permit the occupant to obtain release of the retractor when the door is opened to permit his ingress and egress. The belt retractor is continuously biased in a belt retracting direction to bias the restraint belt to restrained position. Releasable lock means normally locks the belt retractor against belt extension and movement of the restraint belt to unrestrained position. The retractor lock means is released upon operation of a release handle of the vehicle body door lock and is maintained released when such handle disengages the bolt of the door lock from its cooperating striker. The lock is of the uncoupling type, and when the release handles are uncoupled from the detent of the lock bolt, operation of a handle releases the retractor lock means to permit belt extension relative to the retractor and movement of the restraint belt to an unrestrained position. This permits a seated occupant to actuate the inside handle and have freedom of movement within the vehicle while the door remains closed and locked. Upon release of the handle by the occupant, the restraint belt returns to restrained position as the retractor lock means again locks the retractor against belt extension. When the release handles are coupled to the lock, operation of a handle releases both the lock bolt and the belt retractor lock means. The disengagement of the bolt from the striker maintains the lock means released while the door remains open and the release handle is released. The restraint belt moves to an unrestrained position upon movement of the door to an open position to permit occupant ingress and egress. Closing movement of the door and engagement of the lock bolt with the striker permits the restraint belt to return to restrained position as the retractor lock means locks the retractor against belt extension.

One feature of this invention is that it provides a control means for releasing a normally locked occupant restraint belt retractor in accordance with certain operating conditions of a vehicle body door lock to control movement of a passive type restraint belt from restrained to unrestrained position. Another feature is that the control means includes spaced interconnected release means respectively mounted on the latch means for the vehicle body door and on the retractor and being movable to an actuated position to release the retractor upon operation of a release handle for the door latch, the door latch including blocking means blocking return movement of the release means to unactuated position upon disengagement of the bolt of the latch means from its cooperating striker. A further feature is that the blocking means is biased to a blocking position and is located in unblocked position by engagement of the latch means and striker means. Yet another feature is that the blocking means and one of the release means move in paths transverse of each other, with the blocking means being located in the path of the one release means when in blocking position to block return thereof to unactuated position. Still another feature is that the blocking means includes a blocking lever mounted on the latch means and resiliently biased to blocking position, the lever being engaged by the striker means upon closing movement of the door for movement against a resilient bias to an unblocked position out of the path of movement of the one release means.

These and other features of this invention will be readily apparent from the following specification and drawings wherein:

FIG. 3 is a view taken generally along line 3—3 of FIG. 2; and

FIG. 4 is an enlarged perspective view of a portion of FIG. 1.

Figure 1:
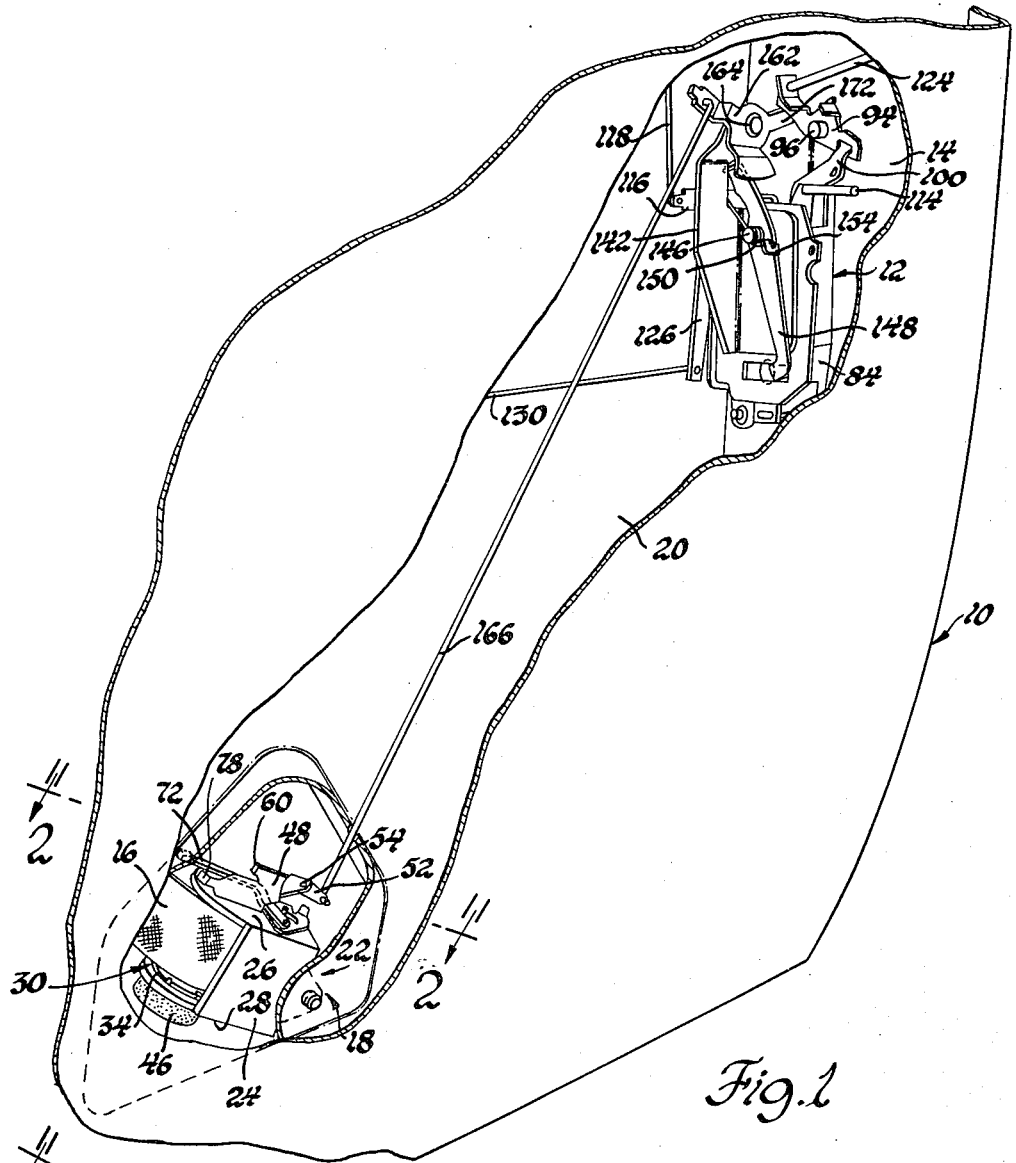
FIG. 1 is a partial side elevational view of a vehicle body door embodying a control means for a normally locked restraint belt retractor according to this invention.

Referring now particularly to FIG. 1 of the drawings, a vehicle body front door designated generally 10 is hinged adjacent its forward edge, not shown, in a conventional manner to the body for movement between a closed position, as shown, and an open position, not shown. Door 10 is held in closed position by a door latch 12 mounted on the inside of the rear wall 14 of the door. A front seat, not shown, for the driver of the vehicle may be of the bench or of the bucket type. A belt restraint system of the type shown in Ser. No. 144,524 Fancy, filed May 18, 1971, and assigned to the assignee of this invention, is provided for the driver and includes lap and shoulder belts having their inboard ends respectively secured to the floor pan and to the seat or roof structure of the vehicle inboard of the driver seating position. If the seat is of the bucket type, the inboard belt ends will be mounted adjacent the seat cushion and seat back of such seat. If the seat is of the bench type, the inboard end of the lap belt may be mounted on the floor pan adjacent and below the seat cushion and extend forwardly through such seat cushion and seat back. The lap belt may be mounted either on the seat back or on the roof panel above the seat back.

The outboard ends of the lap and shoulder belt may be integrally connected or may be stitched or otherwise secured to each other. An outboard belt has one end secured to the lap and shoulder belts. If the outboard belt is retracted rearwardly of the body, it can be seen that the lap and shoulder belts will be moved rearwardly to restrained position with respect to the seated occupant. Likewise if the outboard belt is extended forwardly of the vehicle, the lap and shoulder belts will be moved forwardly to unrestrained position with respect to a seated occupant.

The outboard belt is extended forwardly of the vehicle by a pulley arrangement which includes a belt secured to the instrument panel and extending around a roller on the door and then around a roller on the instrument panel to the outboard belt or to the juncture of the lap and shoulder belts. Such an arrangement is shown in the aforenoted Fancy application. While a particular belt restraint system has been described, this invention is not limited to this system and may be used with other similar belt restraint systems.

In accordance with this invention, the other end of the outboard belt 16, FIG. 1, is secured to a belt retractor 18 for extension and retraction relative thereto in accordance with the operating condition of the door latch 12. The retractor 18 is mounted on the inner panel 20 of the door 10 adjacent the rear wall 14 thereof. The retractor is located outboard of and adjacent the outboard side of the seat cushion of the front seat.

Figure 2:
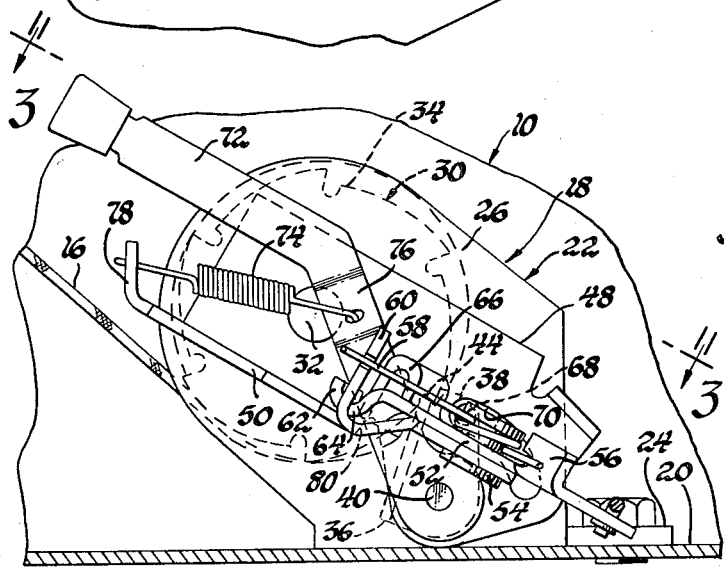
FIG. 2 is an enlarged view taken generally along line 2—2 of FIG. 1.

As shown in FIGS. 1, 2, and 3, the retractor 18 includes a generally U-shaped frame 22 having a base wall 24 and oppositely disposed side walls 26 and 28. The base wall 24 is suitably bolted or otherwise secured to the inner panel 20, as shown in FIG. 2. Suitable reinforcements may be provided on the panel to accept the load from the retractor as required.

A reel 30 includes a shaft 32 journaled in aligned apertures in the walls 26 and 28 and a pair of like toothed end plates or ratchets 34 which are fixed to the shaft 32 adjacent the inboard sides of walls 26 and 28. A generally U-shaped pawl 36 has the aligned apertured lateral legs 38 thereof swingably mounted on a shaft 40 which extends between and is secured to the walls 26 and 28 of frame 22. A coil torsion spring 42 surrounds the shaft 40 and is hooked between the base wall 24 and the pawl 36 to continually bias the pawl 36 counterclockwise, as viewed in FIG. 2, and locate the longitudinally aligned shoulders 44 of such pawl in engagement with aligned shoulders of the toothed end plates 34 of the reel to normally block clockwise movement of such reel as viewed in FIG. 2. The shaft 32 of the reel is conventionally secured to the other end of the outboard belt 16 of the restraint system. Extension of this belt to move the lap and shoulder belts to unrestrained position requires clockwise movement of the reel. This is normally blocked by the cooperating shoulders of the pawl and end plates. Although not shown, a conventional clock spring is housed within a housing 46, FIG. 1, and is connected between the shaft 32 and wall 28 to continuously bias the reel 30 in a counterclockwise direction and thereby apply a continuous retracting force on the outboard belt 16 to normally locate the lap and shoulder belts in restrained position with respect to the driver.

As best shown in FIGS. 2 and 3, an angle bracket 48 has one leg thereof secured to the wall 26 of the frame 22. The shafts 32 and 40 are slidably received within openings in the one leg of the bracket to index this one leg relative to the wall 26. The other leg 50 of the bracket 48 is offset and a release lever 52 is pivoted to the offset of the leg at 54. Lever 52 includes a lateral notched tab 56, and a coil torsion spring 58 surrounds the pivot 54 and is hooked between the tab 56 and a like tab 60 of leg 50 to continually bias lever 52 counterclockwise as viewed in FIG. 3 to unactuated position. The lever is located against the action of the spring 58 by the engagement of an upwardly offset lateral tab 62 thereof with the tab 60. As shown in FIG. 2, tab 62 is joined to the body of the lever by an arcuate rib 64 which slidably bears on the leg 50 to locate the lever 52 with respect to the leg 50 in all positions thereof. The lever 52 includes another downwardly offset tab 66, shown best in FIG. 2, for a purpose to be hereinafter described.

A pin or extension 68 extends laterally of one leg 38 of pawl 36 through an arcuate slot 70 in the wall 26 and also in the leg of bracket 48 secured to this wall. The pin extends freely through the slot 70 and is not intended to engage either end of the slot for locating purposes. As shown in FIG. 3, when the lever 52 is in its unactuated position, tab 66 is located in spaced relationship to the pin 68. However, if the lever 52 is rotated clockwise to actuated position, as will be described, against the action of the spring 58, tab 66 will engage and move pin 68 clockwise, FIG. 2, within the slot 70. This will rotate the pawl 36 clockwise and move the shoulders 44 of the pawl out of engagement with the aligned shoulders of the end plates 34 of reel 30 to permit clockwise movement of the reel 30 in a belt extending direction. The consequent movement of belt 16 in an extending direction permits movement of the restraint belt to unrestrained position. Upon release of the lever 52, spring 58 immediately rotates the lever counterclockwise, FIG. 3, to its unactuated position wherein tab 62 again engages tab 60. Spring 42 then rotates the pawl counterclockwise, FIG. 2, into engagement with the end plates 34 to block any further movement of the reel 30 in a belt extending direction. The reel spring, however, continuously rotates the reel counterclockwise in a belt retracting direction to return the restraint belt to restrained position. Thus release of the pawl shoulders 44 from the aligned shoulders of the end plates 34 and movement of the restraint belt to unrestrained position can only occur when the lever 52 is moved to actuated position.

A manually operable lever 72 is pivotally mounted on the shaft 40 outboard of wall 26. A coil tension spring 74 is hooked between an offset portion 76 of the lever and an apertured lateral tab 78 of the leg 50 of bracket 48 to continuously bias the lever 72 counterclockwise, as viewed in FIG. 2, to its unactuated position wherein the lever is located by engagement with an edge 80 of leg 50 as shown in FIG. 2. Upon clockwise movement of the lever as viewed in FIG. 2, it can be seen that the lever will pick up the pin 68 and move the pin clockwise within slot 70 to rotate pawl 36 clockwise and thereby release the pawl shoulders from engagement with the end plates of the reel. This releases the reel 30 for movement in a belt extending direction as previously described. The driver can move lever 72 to release reel 30 at any time regardless of the condition of the door lock and regardless of operation of the lever 52. Upon release of lever 72, the restraint belt returns to restrained position as previously described.

The lock 12, shown in FIGS. 1 and 4, is basically the same as a current production door lock except for the addition of a release lever and blocking lever as further described. The lock is also very similar to that shown in Fox et al. U.S. Pat. No. 3,190,682 except for the aforenoted release and blocking levers and except for the inside remote handle being coupled to the detent through the intermittent member rather than being directly coupled to the detent as in Fox. Thus, when the intermittent member of the lock 12 is uncoupled from the detent, both the inside and outside handles are uncoupled from the detent rather than only the outside handle being uncoupled as in Fox. Accordingly, only a brief description of the lock 12 will be given herein and reference may be had to the Fox patent as well as to the current production lock for further details.

The bolt 80 of lock 12 is pivoted at 82 between the main frame 84 and the auxiliary frame 86 for movement between an unlatched position, as shown in FIG. 4, and a latched position counterclockwise thereof wherein the bolt throat receives the shank of a headed striker pin to maintain the door 10 in closed position. The bolt is conventionally biased to unlatched position. A pivoted detent 88 is provided for engagement with either a bolt shoulder 90 or a bolt shoulder 92 to maintain the bolt, respectively, in first and second latched positions.

An operating lever 94 is pivoted at 96 to an extension of the frame 84 and is biased clockwise by a coil torsion spring 98 which surrounds the pivot 96 and is hooked between the frame extension and an intermittent member 100 having an upper offset end 102 received in a slot 104 of the operating lever to pivotally couple the operating lever and the intermittent member. The lower end of the intermittent member includes a tab 106 which underlies a shoulder of the detent 88. Upward movement of the intermittent member in its coupled position, as shown, by the lever 94 upon counterclockwise movement of the latter rotates the detent 88 counterclockwise of its pivot to move the detent foot 108 out of engagement with either the bolt shoulder 90 or 92 and permit clockwise movement of the bolt from its latched position to its unlatched position, as shown.

A locking lever 110 is pivoted at 112 to the auxiliary frame 86 and is conventionally coupled at 114 to an outside key cylinder assembly and at 116 to a garnish button by means of a rod 118, FIG. 1. The locking lever includes a lateral tab 120 pivotally and slidably received in a slot 122 of the intermittent member to couple the locking lever and intermittent. The locking lever is movable between an unlocked position, as shown, and a locked position, not shown, counterclockwise thereof upon actuation of either the key cylinder assembly or the garnish button. The locking lever is conventionally located in either position. When the locking lever is in locked position, the intermittent member is located counterclockwise of its position shown, in uncoupled position wherein tab 106 no longer underlies the shoulder of the detent so that the lever 94 and member 100 are uncoupled from the detent and will merely freewheel when operated.

The lever 94 is conventionally coupled by a push rod 124, FIG. 1, to a conventional outside door handle, not shown. A remote bellcrank lever 126 is pivoted at 128 to a lateral flange of auxiliary frame 86 and has one leg coupled by a rod 130, FIG. 1, to a conventional inside remote handle. The other leg of the lever 126 overlies a leg 132 of a transfer lever 134 pivoted at 136 to the auxiliary frame 86 coaxial with detent 88. The other leg of lever 134 extends between tabs 138 and 140 of the intermittent member 100 whereby counterclockwise movement of the lever 134 upon clockwise movement of lever 126 shifts the intermittent member 100 upwardly to release the detent from the bolt, as previously described. Thus, when the intermittent member is uncoupled from the detent by the locking lever 100, the outside door handle and inside remote handle are likewise uncoupled and actuation thereof merely freewheels the intermittent member 100 and the lever 94.

An angle bracket 142 has one leg 144 thereof welded or otherwise fixed to the auxiliary frame 86 as shown. Leg 144 pivotally mounts at 146 a blocking lever 148. A coil torsion spring 150 surrounds the pivot 146 and is hooked between the other leg 152 of bracket 142 and a notched lateral tab 154 of the blocking lever to continually bias the blocking lever clockwise of pivot 146 to its blocking position shown in FIG. 4. The upper end of the lever 148 includes a lateral tab 156 and the lower end includes a lateral tab 158 which extends inwardly of a generally rectangularly shaped opening 160 in the auxiliary frame 86. The tab 158 lies in the path of movement of the head of the striker pin as the striker pin and bolt engage and disengage during door closing and opening movement, respectively. When the door is closed and the bolt is in latched position in engagement with the shank of the striker pin, as shown in FIG. 1, the head of the striker pin, schematically indicated therein, engages tab 158 and rotates lever 148 counterclockwise from its position shown in FIG. 4 to its unblocking position shown in FIG. 1 against the action of the spring 150. When the door is opened and the bolt disengages from the striker pin shank, spring 150 rotates the lever 148 clockwise to its blocking position shown in FIG. 4. The lever is located in this position by the engagement of tab 158 with the left-hand end of opening 160.

A second release lever 162 is pivoted at 164 to the leg 152 of bracket 142 for movement in a plane or path transverse of the plane or path of lever 148. A rod 166 couples lever 162 to lever 52 for simultaneous movement relative to their respective pivots between actuated and unactuated positions. Lever 52 is, of course, normally located in unactuated position by spring 58 and tabs 60 and 62, as previously described. In turn, rod 166 normally locates lever 162 in unactuated position, as shown in FIG. 1. In this position, the tab 156 of the blocking lever 148 is located to the left and out of the path of an offset flange 168 of lever 162.

Assume now that either the inside or the outside handle is operated to rotate the lever 94 counterclockwise as viewed in FIG. 1. An edge 170, FIG. 4, of lever 94 will engage an underlying tab or leg 172 of lever 162 to rotate this lever clockwise, as viewed in FIG. 1. As the lever rotates clockwise, rod 166 will be shifted upwardly and lever 52 will be rotated clockwise, as viewed in FIG. 3, to its actuated position against the action of spring 58. This will, of course, release reel 30 for movement in a belt extending direction, as previously described.

If the intermittent member 100 is coupled to the detent 88 when lever 94 is rotated counterclockwise, the bolt 80 will be released from engagement with the striker pin as previously described so that the door can be opened. As the door is opened, the blocking lever 148 moves to its blocking position of FIG. 4 as previously described In this position, tab 156 lies in the path of flange 168 of lever 162 so as to be engaged by the flange 168 when the release handle is released and block return of levers 52 and 162 to unactuated position by spring 58. This maintains the levers 52 and 162 in actuated position, and holds pawl 36 in released position.

Thus, whenever the bolt is released from the detent and moves to unlatched position with respect to the striker pin, the blocking lever 148 blocks return movement of the levers 52 and 162 to unactuated position to maintain pawl 36 out of engagement with the end plates of the reel 30. The reel 30 thus remains free to rotate in a belt extending direction to permit movement of the restraint belt to unrestrained position as the door opens.

When the door is closed, the blocking lever 148 is returned to its unblocked position, shown in FIG. 1, by engagement with the head of the striker pin when the shank of the pin is engaged by the bolt 80 upon movement of the bolt to latched position. This releases levers 62 and 152 for movement to their unactuated position under the action of spring 58. Pawl 36 then returns into engagement with the end plates of the reel to block any movement of the belt 16 in an extending direction while, of course, permitting movement of this belt in a retracting direction as the restraint belt moves to restrained position.

If the intermittent member 110 is not coupled to the detent, it is believed obvious that the pawl 36 will be released from the end plates of the reel only while a release handle is operated. Upon release of the handle, the levers 162 and 52 immediately return to their unactuated position so that the pawl again engages the end plates of the reel.

Thus this invention provides an improved control means for an occupant restraint belt retractor.

We claim:

1. In a vehicle body having a closure movable between open and closed positions with respect to a body opening, cooperatively engageable latch and striker means on the closure and body movable into and out of engagement with each other for respectively holding the closure in closed position or permitting movement thereof to open position, and latch release means operable to release the latch means from the striker means for movement relative thereto with the closure as the closure moves to open position, the combination comprising, a belt retractor including a reel movable in belt extending and retracting directions, pawl and ratchet means normally engageable with each other to lock the reel against movement in a belt extending direction, first release means mounted on the retractor for movement between an unactuated position wherein cooperating means on the first release means and on the pawl are disengaged and an actuated position wherein the cooperating means are engaged to move the pawl out of engagement with the ratchet means and permit movement of the reel in a belt extending direction, second release means movably mounted on the latch means, means interconnecting the first and second release means for simultaneous movement between actuated and unactuated positions, means biasing the first and second release means to unactuated position and resisting movement thereof to actuated position, means coupling the second release means to the latch release means for movement of the first and second release means to actuated position against the biasing means upon operation of the latch release means, and means movable into the path of movement of the second release means upon release of the latch means from the striker means to block return movement of the first and second release means to unactuated position under the action of the biasing means upon cessation of operation of the latch release means.

2. In a vehicle body having a closure movable between open and closed positions with respect to a body opening, cooperatively engageable latch and striker means on the closure and body movable into and out of engagement with each other for respectively holding the closure in closed position or permitting movement thereof to open position, and latch release means operable to release the latch means from the striker means for movement relative thereto with the closure as the closure moves to open position, the combination comprising, a belt retractor including a reel movable in belt extending and retracting directions, pawl and ratchet means normally engageable with each other to lock the reel against movement in a belt extending direction, a first release lever mounted on the retractor for movement between an unactuated position wherein the first release lever and the pawl are disengaged, and an actuated position wherein the release lever engages and moves the pawl out of engagement with the ratchet means to permit movement of the reel in a belt extending direction, a second release lever movably mounted on the latch means, means interconnecting the first and second release levers for simultaneous movement between actuated and unactuated positions, means biasing one release lever to unactuated position to maintain both levers in such position and resist movement thereof to actuated position, means coupling the second release lever to the latch release means for movement of the first and second release levers to actuated position against the biasing means upon operation of the latch release means, and blocking means movable into the path of movement of the second release lever upon release of the latch means from the striker means to block return movement of the second release lever and of the first release lever to unactuated position under the action of the biasing means upon cessation of operation of the latch release means.

3. In a vehicle body having a closure movable between open and closed positions with respect to a body opening, cooperatively engageable latch and striker means on the closure and body movable into and out of engagement with each other for respectively holding the closure in closed position or permitting movement thereof to open position, and latch release means operable to release the latch means from the striker means for movement relative thereto with the closure as the closure moves to open position, the combination comprising, a belt retractor including a reel movable in belt extending and retracting directions, pawl and ratchet means engageable with each other to lock the reel against movement in a belt extending direction, pawl release means movable from an unactuated position to an actuated position to move the pawl out of engagement with the ratchet means and permit movement of the reel in a belt extending direction, means coupling the pawl release means and the latch release means for movement of the pawl release means to actuated position upon operation of the latch release means, blocking means mounted on the latch means for movement between blocking and unblocking positions, means biasing the blocking means to blocking position in the path of movement of the pawl release means to block return movement of the pawl release means to unactuated position upon cessation of operation of the latch release means, and cooperating means on the blocking means and striker means maintaining the blocking means in unblocking position upon engagement of the striker means and latch means.

4. In a vehicle body having a closure movable between open and closed positions with respect to a body opening, cooperatively engageable latch and striker means on the closure and body movable into and out of engagement with each other for respectively holding the closure in closed position or permitting movement thereof to open position, and latch release means operable to release the latch means from the striker means for movement relative thereto with the closure as the closure moves to open position, the combination comprising, a belt retractor including a reel movable in belt extending and retracting directions, pawl and ratchet means engageable with each other to lock the reel against movement in a belt extending direction, pawl release means movable from an unactuated position to an actuated position to move the pawl out of engagement with the ratchet means and permit movement of the reel in a belt extending direction, means coupling the pawl release means and the latch release means for movement of the pawl release means to actuated position upon operation of the latch release means, blocking means movable between a blocking position in the path of movement of the pawl release means to block return movement of the pawl release means from actuated to unactuated position and an unblocking position out of such path of movement, means normally locating the blocking means in blocking position, and means on the blocking means engageable by the striker means upon engagement of the striker means and latch means to locate the blocking means in unblocking position.

* * * * *